United States Patent [19]

Schwab et al.

[11] Patent Number: 4,551,289

[45] Date of Patent: Nov. 5, 1985

[54] METHOD OF AND APPARATUS FOR MAINTAINING A CONSTANT WALL THICKNESS FOR AN EXTRUDED ARTICLE

[75] Inventors: Erwin Schwab, Meinerzhagen; Graziano Parisi, Bad Oeynhausen; Peter Pander, Düsseldorf, all of Fed. Rep. of Germany

[73] Assignee: Battenfeld Extrusionstechnik GmbH, Bad Oeynhausen, Fed. Rep. of Germany

[21] Appl. No.: 579,723

[22] Filed: Feb. 13, 1984

[30] Foreign Application Priority Data

Feb. 12, 1983 [DE] Fed. Rep. of Germany ....... 3304865

[51] Int. Cl.⁴ .................................................. B29D 7/22
[52] U.S. Cl. ..................................... 264/23; 264/40.1; 264/40.2; 264/40.4; 264/40.7; 425/141; 425/147; 425/155; 425/159; 425/174.2
[58] Field of Search .................. 264/40.7, 40.4, 40.1, 264/40.2, 23; 425/140–141, 147–148, 155, 159, 174.2

[56] References Cited

U.S. PATENT DOCUMENTS

| | | | |
|---|---|---|---|
| 3,150,213 | 9/1964 | Doering | 425/140 |
| 3,286,302 | 11/1966 | Doering | 425/141 |
| 3,368,007 | 2/1968 | Palmer | 264/40.1 |
| 3,474,160 | 10/1969 | Doering | 264/40.1 |
| 3,827,287 | 8/1974 | Boggs et al. | 425/141 |
| 3,881,651 | 5/1975 | Wilhelm, Jr. | 425/140 |
| 4,088,721 | 5/1978 | Apicella, Jr. | 264/40.4 |
| 4,137,025 | 1/1979 | Graves et al. | 425/71 |
| 4,244,897 | 1/1981 | Moon | 264/40.4 |
| 4,377,540 | 3/1983 | Cluett et al. | 264/23 |
| 4,382,761 | 5/1983 | Daubenbüchel et al. | 425/140 |
| 4,425,290 | 1/1984 | Upmeier | 425/141 |
| 4,428,896 | 1/1984 | Stevenson | 425/140 |

FOREIGN PATENT DOCUMENTS

| | | | |
|---|---|---|---|
| 2302965 | 7/1974 | Fed. Rep. of Germany | 425/147 |
| 2505221 | 8/1976 | Fed. Rep. of Germany | 425/141 |
| 2634280 | 2/1978 | Fed. Rep. of Germany | 425/147 |
| 2742984 | 3/1978 | Fed. Rep. of Germany | 264/40.4 |
| 51-59957 | 5/1976 | Japan | 264/23 |

*Primary Examiner*—Jeffery Thurlow
*Attorney, Agent, or Firm*—Karl F. Ross; Herbert Dubno

[57] ABSTRACT

An extruder is controlled in response to the thickness measurement of the extruded strand. The thickness measuring head is initially given a displacement transverse to the extrusion direction, preferably around the extruded strand and the output signals from the head are integrated to form a mean value around the periphery. A comparison of this mean value with the set point wall thickness value is then utilized to provide continuous correction of the output of the head which is utilized to regulate the extruder operation.

17 Claims, 5 Drawing Figures

METHOD OF AND APPARATUS FOR MAINTAINING A CONSTANT WALL THICKNESS FOR AN EXTRUDED ARTICLE

FIELD OF THE INVENTION

Our present invention relates to a method of and an apparatus for maintaining a constant wall thickness of an extruded article and, more particularly, for holding constant the wall thickness in the extrusion and blowing foils, tubes or tubular strands of extruded synthetic resin materials.

BACKGROUND OF THE INVENTION

The extrusion of synthetic resin materials can be used for many purposes and, in general, the thermoplastic material, in the form of a granulate (e.g. a powder or other collections of flowable particles) is introduced into one end of an extruder having at least one worm which is rotated to displace the synthetic resin material axially in a worm cylinder so that the extruded material can emerge from the opposite end of this cylinder. Within the cylinder, while undergoing axial displacement in the manner described, the synthetic resin material also is subjected to a vigorous mechanical action involving shear and compression as well as mixing and homogenization so that the mechanical action by the generation of heat alone or in combination with external heating results in a plastification and liquefaction of the thermoplastic material.

The discharge end of the extruder can be provided with an aperture from which the material emerges with a certain wall thickness and this extruder length can be formed with a die to impart any desired shape to the synthetic resin material which emerges. The preferred form is a tube or pipe.

Such extruded strands can be subjected to blowing, i.e. the expansion by inflation with air, to draw the wall of the tube into a foil. This process is frequently termed foil blowing. A tubular strand can also form a parison for blow molding.

The wall of the tube can be left intact if the continuous strand emerging from the discharge end of the extruder is permitted to cool and the resulting solidified or hardened strand can be subdivided into lengths. The lengths thus formed can be utilized as pipes or can be employed for various purposes and can even be deformed or further shaped as desired.

One of the problems in the extrusion of tubular strands of synthetic resin material is to maintain the wall thickness substantially constant with changes in the characteristics of the material, operating parameters and external conditions. For this purpose a measuring or metering cylinder can be provided at the upstream end of the extruder and can form an upright column of synthetic resin granulate to be fed to the latter by gravity. The level in this cylinder is detected by transducer means generating electrical pulses with a pulse interval determined by this level and which are compared with set-point values determined by the extruding rate and the weight of the synthetic resin strand per unit length, an error or correction scale resulting from this comparison serving to control the feed of the granulate to the measuring cylinder.

In German patent document No. 1,964,386 there is described a device for carrying out a process of the aforedescribed type. With this device the extrusion or discharge rate of the synthetic resin strand can be so modified that the wall thickness can be kept constant between predetermined limits.

The operation of this conventional system is based upon the fact that there is a linear relationship between the detected rate or feed of material to the extruder, i.e. the extruder intake and the rate of material discharged from the extruder, i.e. the extruder outflow. With the control system of this patent, by comparison with systems without wall thickness control in the aforedescribed manner, it is possible to achieve a significant saving in the synthetic resin material which is utilized, i.e. the consumption of this synthetic resin material is reduced.

Practical use of such systems has demonstrated that for the customary cross section of extruded synthetic resin strands, a mean wall thickness can be maintained with good approximation. However, the absolute wall thickness or, more accurately, the instantaneous wall thickness, can vary significantly from the mean wall thickness value and indeed these variations can have a significant band width, i.e. there can be substantial variations above and below the mean value of the wall thickness.

This poses serious problems, especially when the synthetic resin strand is to be utilized as a parison or is to be used in the formation of a parison for the blow-molding operation. In this application of the extruder product a significant drop in wall thickness, or even a small local region, may result in defects in the blow-molded product, while any significant thickening may adversely effect the blow-molding process and the quality of the product produced therein.

Consequently, in spite of the fact that the mean wall thickness can be held constant without difficulty with the conventional units, the variation in absolute wall thickness, the instantaneous wall thickness or local wall thickness, creates problems which must be solved for effective use of the extruded product.

OBJECTS OF THE INVENTION

It is the principal object of the present invention to provide an improved method of operating an extruder and/or controlling the wall thickness of an extruded product whereby the wall thickness is maintained substantially constant in the sense of the average wall thickness as well as in the local sense without the disadvantages encountered in earlier processes.

Still another object of the invention is to provide a method whereby, in addition to maintaining mean constant wall thickness, an absolute minimum wall thickness can be ensured.

Still another object of this invention is to provide a method for holding the wall thickness of an extruded article substantially constant while obviating drawbacks from earlier techniques.

Yet another object of the invention is to provide an improved apparatus for carrying out the method of the invention and/or for extruding synthetic resin materials in the formation of tubular articles having substantially constant wall thickness.

SUMMARY OF THE INVENTION

These objects and others which will become apparent hereinafter are attained, in accordance with the invention, in a method of operating an extruder wherein the continuous strand produced by the extruder can be a tube or flattened structure, e.g. for foil blowing, of thermoplastic synthetic resin and in which a synthetic resin granulate is fed to the extruder through a measuring cylinder. In such an apparatus, a level detector is responsive to the level of the synthetic resin granulate in the measuring cylinder and produces pulses whose pulse spacings are compared with a set point value time which is determined by the rate at which the strand is withdrawn from the extruder and the weight of the strand per unit time, the comparison of the actual value (representing the level) and the set-point value (representing the quotient and the rate of withdrawal of the strand and the weight per unit length) being utilized to control the feed of the granulate to the measuring cylinder.

According to the invention, downstream of the extruder, the extruded strand is provided with a wall thickness measurement which is effected by a scanning action in a direction transverse to the feed direction of the strand and which can preferably extend over the full transverse extent of the latter. The thickness scan in the transverse direction provides a mean value over the full path of this scan which results from the integration of the incremental thickness signal and this mean value is compared with and utilized to correct the mean value of the measurement which is utilized to control the extruder assembly. The extruder assembly which can comprise the extruder and a device for drawing the strand away from the extruder thus can be controlled in response to a continuous thickness measurement and, with the system of the invention, this measurement is corrected in accordance with the integrated or mean value obtained during an initializing operation in which the thickness measuring head scans the strand.

In other words, the scanning and integrating operation is carried out so as to correct the mean value which is then utilized for direct wall thickness measurements of the strand so that the corrected actual value serves as a continuous input for controlling the extruder and/or the strand withdrawal unit.

The most significant advantage of this method is that the calculated mean value which is established before extruder operation, e.g. by selecting a wall thickness, thus can be considered a control head of the extruder because it serves to regulate, inter alia, the feed of the granulate to the latter, corrected by the mean value of the wall thickness actually obtained downstream of the extruder by measurement so that an absolute measured value can correct the relative regulated value to ensure that a minimum wall thickness will always be maintained by the extruder.

It has been found to be advantageous to measure the wall thickness downstream of the extruder by a contactless ultrasonic measurement head, e.g. by the pulse-echo or reflectoscope principle.

According to another feature of the invention, the wall thickness measurement utilizing a movement previous to the direction of extrusion of the strand is effected only for the initialization or correction operation. It has been found to be advantageous in a greater number of cases, however, to carry out the continuous wall thickness measurement with such a transverse movement of the measuring head. Indeed, the wall thickness measurement can be effected continuously and in a unidirectional transverse movement, especially when the strand is a tube or tubular body, this movement being a circular movement around the path of the strand.

The scanning pattern or the continuous wall thickness measurement thus may be helical vis-a-vis the continuous strand. The initial scanning motion may also take place along a helical pattern although preferably the initial thickness measurement from which the integrated mean value is generated for correction purposes is effected along a closed path around the strand, i.e. in one transverse plane thereof. To accomplish this without interrupting the continuous movement of the strand, we may move the scanning head around the strand while displacing in the direction of strand extrusion, at the same rate, i.e. synchronously with the strand.

With a flattened strand, the scanning movement can be a back-and-forth or linear movement.

According to another aspect of the invention, an apparatus is provided which can utilize the method principles described and thus which has a drive for the thickness measurement head enabling it to have the transverse movement previously described.

This means can be provided to effect the transverse displacement exclusively during the initial period of extrusion for correction purposes and/or so as to effect this transverse displacement continuously over the entire extrusion for thickness measurement purposes. When the initial correction measurement is to be effected, this means can be provided so that it moves the head in the axial direction of extrusion at a rate proportional to the speed of the strand.

According to this aspect of the invention, moreover, for the production of blowing foils, the head is displaced by a drive imparting a back-and-forth linear movement to the head and this drive can be provided with means for superimposing upon this back-and-forth movement, a movement in the direction of extrusion at a rate proportional to the speed of the strand. It has already been noted that this head is most advantageously an ultrasonic measuring device and especially a pulse echo measuring device or reflectoscope.

BRIEF DESCRIPTION OF THE INVENTION

The above and other objects, features and advantages of the present invention will become more readily apparent hereinafter from the following description referring to the appended drawing in which.

SPECIFIC DESCRIPTION

Figure 1:
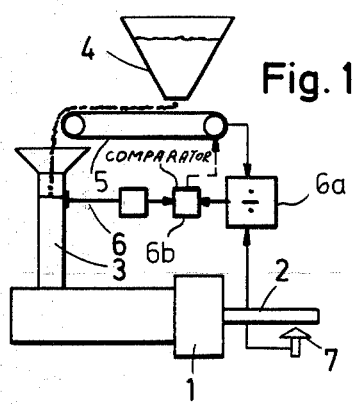
FIG. 1 is a simplified schematic illustration of an extruder system provided with the control of granulate feed.

FIG. 1 shows an extruder 1 which can be utilized to extrude a tube 2, a generally tubular strand or a blowing foil, all hereinafter referred to as a strand and which can, after passing a strand extraction unit 15, be fed to a blow-molding or other machine. The extruder 1 can be of conventional design in that it can include a worm rotatable by an electric motor in turn controlled by the output represented at 1' in FIG. 2. The strand withdrawal unit 15 can be controlled by the output 15' also described in connection with FIG. 2.

The extruder 1 can have a die imparting the desired shape to the strand 2 and, at its upstream end, is fed synthetic resin granules through an upright measuring cylinder 3. The latter receives synthetic resin granules to a certain level, maintained by a level detector 6, the synthetic resin granules being introduced into the cylinder 3 by a conveyor belt weigher 5 which receives the granules from a hopper 4. The weigher 5 enhances the rate of feed of the synthetic resin granules to the cylinder 3 in response to the measurements of the level detector 6.

The level detector 6 controls the level of synthetic resin granules in the measurement cylinder 3 between two limiting values and in response to this level the detector 6 generated an actual value signal in the form of an interval or pulse spacing (actual value time). This actual value time is, of course, proportional to the quotient of the feed rate of synthetic resin by the weigher 5 and the discharge rate of synthetic resin by the extruder 1. The speed of the weigher 5 is regulated in response to the actual value signals from the level detector 6.

More particularly, a set-point value for the weigher 5 is introduced into a quotient former 6a which also receives an input representing the weight per unit time of the extruded strand 2. The resulting quotient forms the set-point input at a comparator 6b to which the actual value signals from the level control 6 is provided. The comparator forms an error or difference signal which controls the speed of the weigher 5.

Adjacent the extruder head a contactless wall thickness measuring head 7 is provided, preferably in the form of an ultrasonic measuring unit which operates in accordance with the pulse echo principle or as a reflectoscope. This unit together with the measuring cylinder 3, the conveyor belt weigher 5 and the level detector 6 forms a measuring and dosing system for extruder 1.

Figure 2:
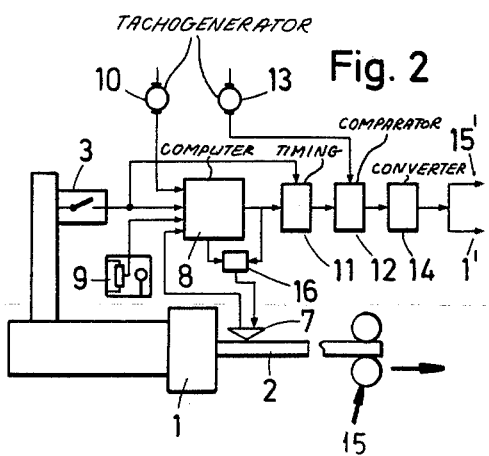
FIG. 2 is a more detailed diagram of an extruder installation utilizing the principles of this invention.

Additional components of the control system are shown in FIG. 2. In FIG. 2 we have shown a computer 8 which serves to produce a set-point as a time function of the input value of the wall weight per unit length of the extruded strand and the rate at which the extruded strand is discharged from the extruder.

To input the desired value of the wall weight per unit length, the input element 9, e.g. a potentiometer, is provided while the extrusion rate input (speed of strand) is derived from a tachometer 10 which can be coupled to a roller in contact with the strand itself.

The actual value time derived from the low measuring unit 6 and the set point 5 from the computer 8 are applied via a timing stage 11 into an evaluating stage 12 receiving a voltage from a tachogenerator 13 coupled with the extruder worm and providing a voltage proportional to the speed of this worm.

The difference between the set point and actual value times from the comparator stage 12 is fed to a time-voltage converter 14 whose output signal is supplied as a control signal 15' or 1' to the extruder 1 or the strand displacement means 15.

Figure 4:
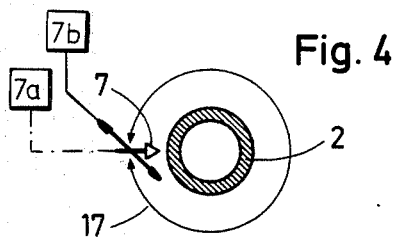
FIG. 4 is a diagram showing the path of the thickness measuring head for tubular synthetic resin strands during the relative measurement and for detecting absolute measuring values.

The wall thickness measuring device 7, upon initial operation of the extruder, serves to provide a correction for the mean value in accordance with which further control is to be effected in the manner described. This unit 7 is displaceable as represented, for example, in FIG. 4, by an appropriate displacing means represented at 7a, transverse over the entire transverse cross section of the strand. In the case of a pipe shown at 2 in FIG. 4, this transverse displacement is effected in a circular pattern 17 all around the periphery of the strand. In the case of a foil which is blown, of course, this displacement can be across the width of the strand.

The first measurement over the full extent of the cross section of the extruded strand by the wall thickness measuring unit 7 thus corresponds to a wall thickness distribution measurement. The measured values over this transverse stretch are supplied to the computer 8, e.g. a microprocessor-based microcomputer which integrates the collected measurements over the full transverse stretch to form a mean value.

This mean value, which serves as a correction or initializing value, is fed by the computer 8 to a comparator 16 which is also supplied with a set point value from the computer 8, this set point value being fed, as previously noted, to the timing stage 11 and being formed as a function of the setting of the desired strand weight per unit length and the rate at which the strand is drawn from the extruder.

The output value from the comparator 16 is utilized to correct the signal generated by the wall thickness measuring device in a direction which tends to approach the set point value, i.e. serves to provide a continuous calibration or standardization of the output from the thickness measuring unit 7.

Figure 3:
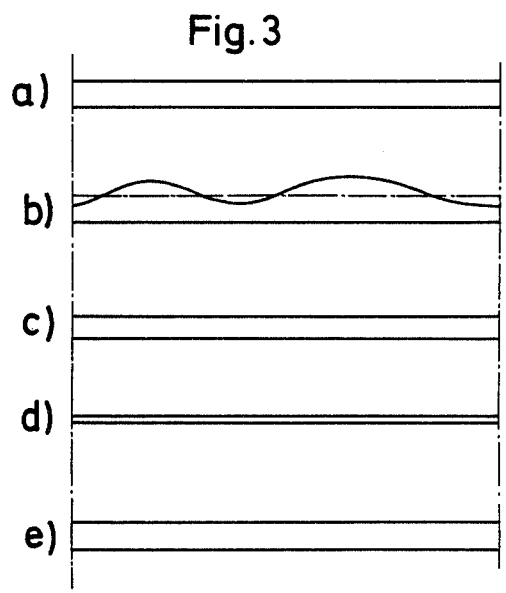
FIG. 3 is a diagram illustrating measurements with time to facilitate the description of the invention.

FIG. 3 is a diagram which may assist in illustrating the effect of this automatic calibration or standardization.

This Figure shows in graphs a through e the wall thickness plotted along the ordinate versus distance in the transverse direction around the strand along the abscissa.

In graph a the region between the two parallel lines represents the mean wall thickness of the pipe 2 which corresponds to the set point output of the computer 8 and which should be maintained over the entire breadth or transverse extent of the strand, i.e. about its periphery.

In graph b, however, the initial mesurement of the wall thickness by the head 7 has been shown.

Graph c represents the mean value formed by integration of the actual measured value from graph b while graph d shows the correction which must be applied to the wall thickness measuring device to generate the corrected or calibrated value at e which is designed to maintain the set point value of graph a.

In the extrusion of pipes 2 or tubular strands of synthetic resin, at the beginning of the extrusion process, the wall thickness measuring unit 7 is initially displaced via the drive 7a around the periphery of the pipe as represented by the arrow 17 and the peripheral measurement is integrated in the computer 8 to provide a mean value corresponding to the integration of the measured wall thicknesses. The difference between this mean value and the predetermined set point value supplied at the input to the computer 8 by any conventional means thus provides a direct correction or error value which is utilized to modify the output of the ultrasonic thickness measuring unit, e.g. by a corresponding change in its output frequency.

The corresponding correction of the sensing frequency of the ultrasonic measuring unit, which preferably operates in accordance with the pulse echo process or as a reflectoscope, permits the wall thickness measuring unit automatically and exactly to be preadjusted by the amount of the correction for subsequent operation.

This thus standardizes the wall thickness measuring unit 7 for further measurements of the wall thickness directly as the pipe is extruded with the resulting actual value measurement serving for automatic control in the manner described of the extruder 1 and/or the device 15 drawing the extruded strand from the extrusion die.

Since the standard wall thickness unit provides an absolute measurement, (i.e. one which is precorrected), its output can be utilized for direct control of the extruder 1 or the drawing unit 15 to reliably maintain a minimum wall thickness of the pipe.

As noted, the wall thickness measuring device 7 for the extrusion of pipes 2 or tubular strands of synthetic resin can continuously be swung around the strand in a circular path and with constant velocity over the control measurements as well as for the initializing measurement, the circular path lying in a plane perpendicular to the extrusion direction.

Consequently the wall thickness measuring unit 7 scans the strand along a helical path or line, i.e. the measurement does not take place in a single cross section plane by a tube or pipe but rather is distributed around the periphery of the pipe in a fashion which depends upon the extrusion speed.

While this is advantageous for the continuous measurements or wall thickness during the extrusion process it may not be advantageous for the purposes of initialization since this requires, for most reliable results, an integration of measurements in a single transverse plane. Consequently, we provide a further drive represented at 7b which can be coupled to the head for synchronously displacing the head 7 parallel to the extrusion direction and at the rate of extrusion so that the full periphery is measured in a single plane in the initialization measurement b previously described.

Figure 5:
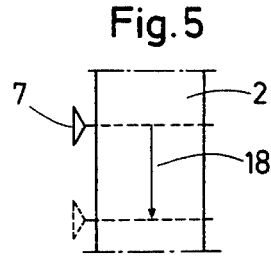
FIG. 5 is a diagrammatic or simplified side elevational view illustrating a variation in the displacement of the head during the detection of the relative measured values.

This displacement is shown in FIG. 5 by the arrow 18.

In the production of blowing foils according to the invention, the extruded strand is flat and wide and instead of a circumferential movement, the drive 7a displaces the head 7 in a back-and-forth movement across the width of the extruded strand. In this case, after an initial length has been extruded, a standardization measurement is taken in the manner described, e.g. while displacing the head in the extrusion direction synchronously with the extrusion speed so that the measurement of the full width of the strand is effected in a single plane. After standardization in the manner described, the head 7 can be moved back and forth across the strand so that the wall thickness sensing is detected along the zigzag path.

We claim:

1. A method of operating an extruder for producing a continuous synthetic resin strand having a wall thickness and a width transverse to a direction of extrusion and engaged by a device for drawing said strand from said extruder, said extruder being provided with a measuring cylinder at an upstream end thereof and with a unit for introducing synthetic resin granules into said cylinder, said method comprising the steps of:
   (a) at an initial stage in the extrusion of said strand from said extruder, displacing a thickness measuring head trasverse to the direction of extrusion over the entire width of said strand to produce wall thickness measurement signals over this width;
   (b) integrating the wall thickness measuring signals to produce a mean value of the wall thickness over said path of said strand;
   (c) comparing said mean value with a set point value determined by a weight per unit length of the extruded strand measurement and a measurement of rate of extrusion of said strand to provide a correction value;
   (d) continuing the extrusion of said strand from said extruder while measuring the wall thickness of said strand with said head; and
   (e) controlling the operation of at least one of said extruder and said device in response to an actual value output of said head corrected by said correction value.

2. The method defined in claim 1 wherein the wall thickness of said strand is measured by said head by an ultrasonic contactless detection.

3. The method defined in claim 1, further comprising the step of displacing said head synchronously with the extruded strand in the direction of extrusion during step (a).

4. The method defined in claim 1 wherein said head is continuously displaced across the width of said strand during wall thickness measurements in step (d).

5. The method defined in claim 1 wherein said strand is a tubular element and said head is displaced around the periphery thereof in step (a).

6. The method defined in claim 1 wherein said strand is a flat element and said head is displaced across said strand in step (a).

7. The method defined in claim 1 wherein the path of said head in step (a) lies in a single transverse plane of said strand.

8. The method defined in claim 1 wherein the path of said head along said strand in step (a) is helical.

9. The method defined in claim 1 wherein the path of the head along the strand in step (a) is a zigzag.

10. In an apparatus for the extrusion of a synthetic resin strand having an extruder from which said strand emerges at a downstream end, a measuring cylinder at an upstream end of said extruder, means for feeding synthetic resin granules into said measuring cylinder and a device engaging said strand for drawing said strand away from said extruder, the improvement which comprises:

a wall thickness measuring head disposed downstream of said extruder for measuring the wall thickness of the extruded strand;

means for displacing said head transverse of said strand for enabling said head to generate wall thickness measuring signals over the entire periphery of said strand;

integrating means for integrating said signals for producing a mean wall thickness value;

means forming a set point value from a measurement of extruded strand weight per unit length and rate of extrusion of the strand;

a comparator for comparing said mean value with said set point value to produce a correction value; and means for controlling at least one of said extruder and said device continuously in response to an output from said head corrected by said correction value to maintain a minimum wall thickness of the extruded strand.

11. The improvement defined in claim 10 wherein said displacing means includes means for driving said head in a circular path around said strand in a plane perpendicular to the direction of extrusion thereof.

12. The improvement defined in claim 10, further comprising means for shifting said head in the extrusion direction synchronously with the extrusion of said strand.

13. The improvement defined in claim 11, further comprising means for shifting said head in the extrusion direction synchronously with the extrusion of said strand.

14. The improvement defined in claim 10 wherein said displacing means is constructed and engaged to impart a transverse back-and-forth movement to said head across said strand.

15. The improvement defined in claim 14, further comprising means for shifting said head in the extrusion direction synchronously with the extrusion of said strand.

16. The improvement defined in claim 10 wherein said head is an ultrasonic contactless thickness detector.

17. The improvement defined in claim 16 wherein said thickness detector is a reflectoscope.

* * * * *